June 10, 1958 D. W. WALDRON, JR 2,838,017
PLANTER ATTACHMENT
Filed April 28, 1955 2 Sheets-Sheet 1

D. W. Waldron, Jr.
INVENTOR

BY *C. A. Snow & Co.*

ATTORNEYS.

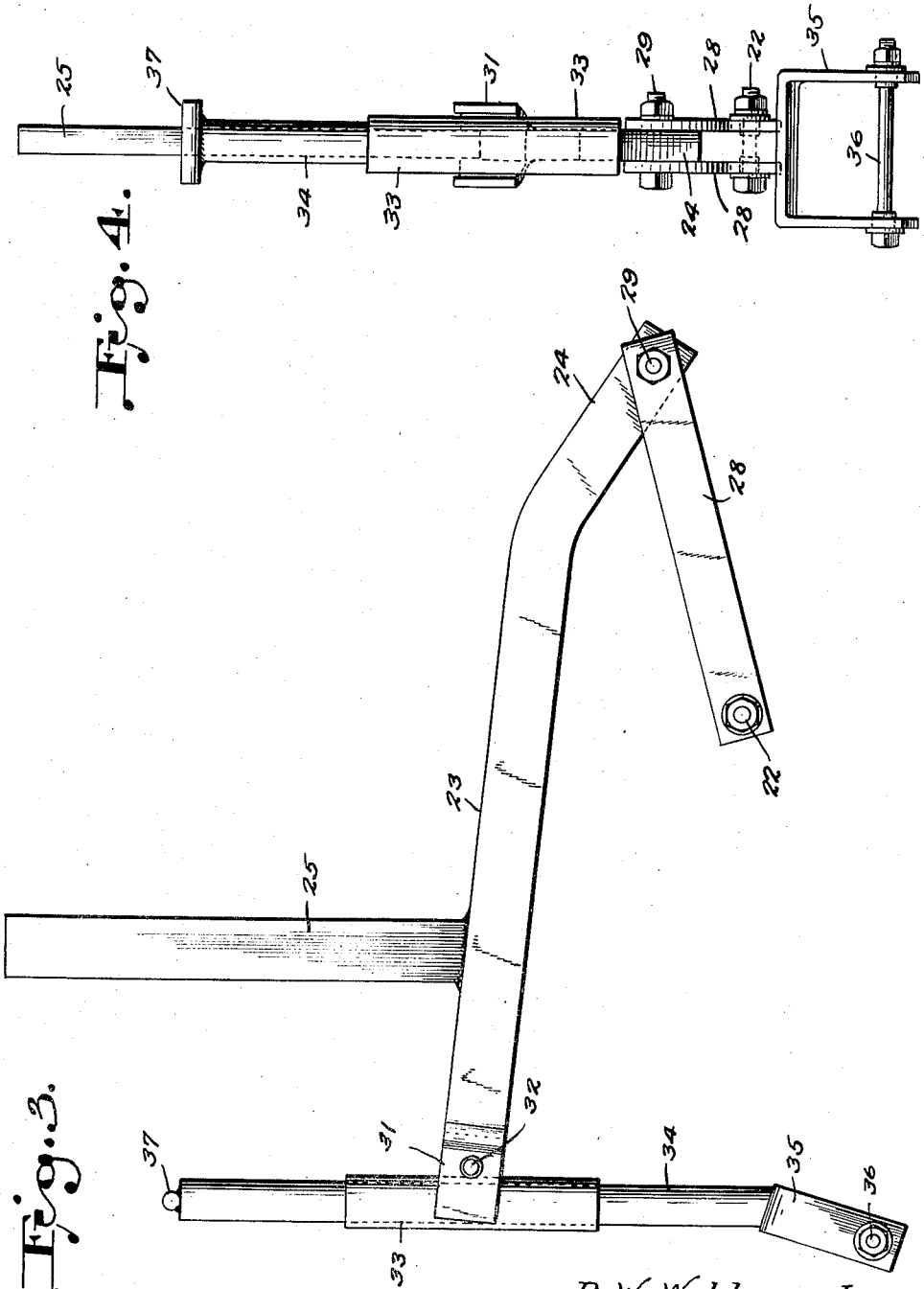

United States Patent Office 2,838,017
Patented June 10, 1958

2,838,017
PLANTER ATTACHMENT

David W. Waldron, Jr., Valdosta, Ga., assignor to Lowndes Engineering Co., Inc., Valdosta, Ga.

Application April 28, 1955, Serial No. 504,466

1 Claim. (Cl. 111—63)

This invention relates to an attachment for mounting a planter on a tractor or cultivator.

An object of this invention is to provide an attachment which may be connected with a conventional planter, whereby the planter may be secured to the rear of a tractor or a cultivator structure.

Another object of this invention is to provide a device of this kind which will firmly hold the planter to the tractor or the cultivator structure and at the same time permit the planter to freely rock up and down in following the contour of the ground.

A further object of this invention is to provide an attachment of this kind wherein the planter may be adjusted to engage in a furrow or ride over the surface of unfurrowed ground.

A still further object of this invention is to provide an attachment of this kind wherein the planter will be raised from the ground when the cultivator is elevated.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

In the drawings:

Fig. 3 is a detail side elevation of the attachment.

Fig. 4 is a front elevation of the attachment.

Figure 1:
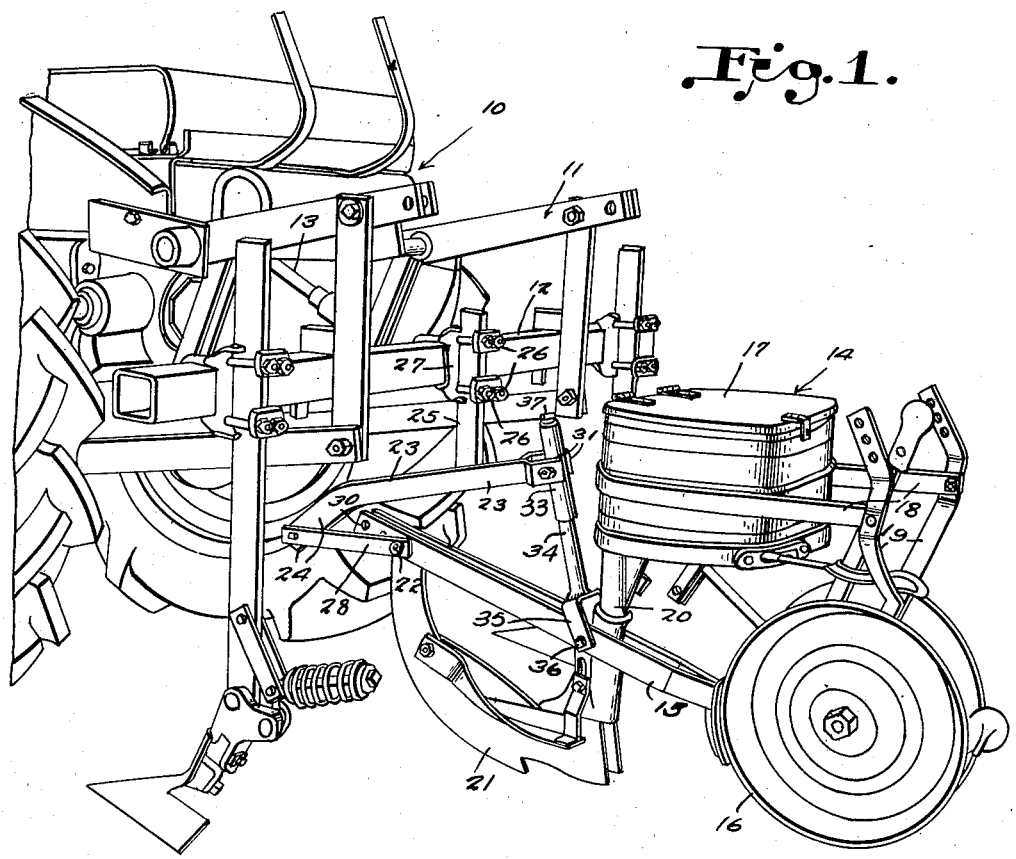
Figure 1 is a fragmentary perspective view from the rear of the tractor having a cultivator structure secured thereto with a conventional planter secured to the cultivator structure by an attachment constructed according to this invention.
Figure 2:
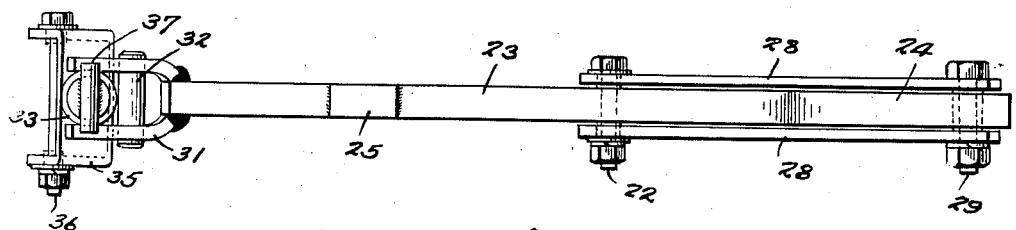
Fig. 2 is a top plan view of the attachment.

Referring to the drawing, the numeral 10 designates generally, a conventional tractor which has mounted on the rear thereof, a cultivator structure, generally indicated at 11. The cultivator structure 11 includes a tubular frame member 12 which is connected with the lift of the tractor 10 by means of a connecting bar or lift member 13. A planter, generally indicated at 14, is mounted on the rear of the cultivator structure 11 and includes a draw bar 15 having a pair of flanged wheels 16 rotatably secured to the rear thereof. A hopper 17 is secured to frame bars 18 and supported by upwardly projecting supporting bars 19, and the hopper 17 includes a chute 20 which projects downwardly to the rear of a shoe 21. The shoe 21 is secured to the forward portion of the draw bar 15 by means of a bolt 22.

Planter 14 is adapted to be detachably secured to the cultivator structure 10 by means of an attachment which comprises an elongated draw bar 23 having an obtusely downwardly turned forward end 24. The draw bar 23 has fixed to the upper side thereof an upwardly projecting bar or shank 25 which is adapted to be pivotally clamped to the cultivator frame member 12 by means of pairs of U-bolts 26. The U-bolts 26 straddle the frame member 12 and project through a plate 27 which engages the rear side of the frame member 12. The draw bar 23 is rockably connected with the forward portion of the draw bar 15 by means of a pair of links 28. The links 28 are pivotally secured by means of a pivot bolt 29 to the forward end 24 of draw bar 23 and the rear ends of the links 28 are pivotally secured on the bolt 22. The draw bar 15 as shown in Fig. 1, is provided with a series of longitudinally spaced apart openings 30, through selected ones of which the bolt 22 is adapted to extend. The rear end of the bar 23 is provided with a fork 31 and a pivot pin 32 loosely engages through the fork 31. The pin 32 is welded or otherwise fixedly secured to a tubular guide 33 which extends loosely between the arms of the fork 31. A shank 34 slidably engages through the guide 33 and is provided at its lower end with a U-shaped yoke 35 which engages on the opposite sides of the draw bar 15 and is pivotally secured thereto by means of a pivot bolt 36.

The upper end of the shank 34 has fixed thereto a stop pin 37 which upon upward movement of the draw bar 23 with the guide 33, is adapted to prevent the shank 34 from dropping out of the guide 33. This pin 37 also provides for raising the draw bar 15.

In the use and operation of this attachment the shank or supporting bar 25 is secured to the tractor frame member 12 by the clamping bolts 26 and the plate 27. The bar or shank 25 is vertically adjusted so that when the cultivator structure 11 is in operative position the shoe 21 will either engage in a furrow or will ride over the surface of unfurrowed ground. As the planter 14 moves over the surface of the ground the shank or slide bar 34 may vertically move up and down in the guide 33. In this way the planter or seeder 14 will be vertically disposed at all times while simultaneously the planter may vertically move up and down so as to ride over the uneven contour of the ground.

What is claimed is:

An attachment for mounting a planter on a tractor or cultivator, comprising an elongated draw bar having an obtusely inclined forward end, a shank fixed to and rising from said draw bar, means adjustably securing said shank to the tractor or cultivator, a pair of links pivotally secured to the forward end of said draw bar and extending rearwardly and downwardly therefrom, said links having a length less than the length of said draw bar, means pivotally securing the rear ends of said links to the forward end of a planter draw bar, a fork at the rear end of said first named draw bar, a tubular guide between the arms of said fork, means rockably securing said guide to said fork, a shank slidable in said guide, a U-shaped yoke fixed to the lower end of said latter named shank, means pivotally securing said yoke to the planter draw bar between the ends of said U-shaped yoke, a planter shoe carried by said planter draw bar, wheels rotatably mounting the rear end of said planter draw bar, and a stop member fixed to the upper end of said latter named shank engageable with said guide for limiting the downward movement of said latter named shank when the planter is raised from engagement with the ground.

References Cited in the file of this patent

UNITED STATES PATENTS 2,561,614    Dixon  ---------------- July 24, 1951
2,694,356    Haas  ----------------- Nov. 16, 1954